(12) United States Patent
Rahnema et al.

(10) Patent No.: US 6,182,251 B1
(45) Date of Patent: Jan. 30, 2001

(54) CHANNEL ESTIMATION IN A FADING CHANNEL

(75) Inventors: Moe Rahnema, Bethesda; Zhen-Liang Shi; Ludong Wang, both of Germantown; Yezdi Antia, Gaithersburg; Mohammad Soleimani, Rockville, all of MD (US)

(73) Assignee: Hughes Electronics Corporation, El Segundo, CA (US)

( * ) Notice: Under 35 U.S.C. 154(b), the term of this patent shall be extended for 0 days.

(21) Appl. No.: 09/198,774

(22) Filed: Nov. 24, 1998

(51) Int. Cl.[7] .................................................. G06F 11/00

(52) U.S. Cl. ............................................ 714/704; 455/67.3

(58) Field of Search .................................... 714/704, 712, 714/715; 455/67.3

(56) References Cited

U.S. PATENT DOCUMENTS 5,533,048 * 7/1996 Dolan .................................... 375/222
5,787,118 * 7/1998 Ueda .................................... 375/232

* cited by examiner

*Primary Examiner*—Phung M. Chung
(74) *Attorney, Agent, or Firm*—John T. Whelan; Michael W. Sales

(57) ABSTRACT

A method of channel estimation in a wireless communication system has steps of receiving a data burst comprising a plurality of portions of known data, and remaining data that is unknown; comparing reference data to each of the plurality of portions of known data and determining error for each of the portions of known data; averaging the determined error for predetermined ones of the portions of known data; and estimating error for at least a portion of the remaining data as a function of the determined error having been averaged.

11 Claims, 5 Drawing Sheets

**CHANNEL ESTIMATION PERFORMANCE
IN STATIC (AWGN) CHANNEL**

**CHANNEL ESTIMATION PERFORMANCE UNDER
RICIAN K=12 dB AND FADING BANDWIDTH=200Hz**

CHANNEL ESTIMATION PERFORMANCE UNDER
RICIAN K=7 dB AND FADING BANDWIDTH=200Hz

SENSITIVITY OF CHANNEL ESTIMATOR
TO FREQUENCY OFFEST

CHANNEL ESTIMATION IN A FADING CHANNEL

BACKGROUND OF THE INVENTION

The present invention relates to estimation of a communications channel, and more particularly to estimating a communications channel at various points in a burst. Even more particularly, the present invention relates to estimation of a communications channel over a wide range of channel conditions, e.g., static to Rician with K=0 dB, with various Doppler rates. Advantageously, the present approach performs its channel estimation function with a substantially smaller processor demand than has been employed in prior art wireless approaches, such as communications approaches.

Communication channels in a cellular environment commonly impose a combination of distorting effects on transmitted signals. Rayleigh fading, where a signal's perceived power level rises and falls rapidly over a wide range, results from the combination (interference) of signals that have traversed paths differing in length by at least a significant fraction of a wavelength (i.e., about 30 cm. for cellular). This type of interference is known as multi-path interference. Differences in path transmission times that approach the time taken to transmit a symbol result in a second problem called delay spread.

Delay spread results in reception of multiple delayed replicas of a transmitted signal. Each Rayleigh faded replica has randomly distributed amplitude and phase, and the rate at which this complex quantity varies is constrained by the Doppler bandwidth associated with a vehicle's speed, which is related to the velocity of, e.g., a mobile unit relative to a base station. In a frequency nonselective environment, the sampled outputs of a receiver's matched filter provide uncorrelated estimates of the transmitted data. As such, in terms of discrete time samples, the channel has exhibited an impulse response proportional to a delta function. With delay spread, on the other hand, the discrete time channel impulse response is extended to introduce energy at a number of symbol times. The effect of the channel on the transmitted signal, in turn, may be viewed as a convolution of the transmitted information with the channel's impulse response. The channel, therefore, emulates a convolutional coding process (encoder).

This leads to the possibility of estimating the transmitted information through the use of methods analogous to typical decoding of convolutional codes, i.e., maximum likelihood sequence estimation techniques.

A mobile satellite communication system typically includes one or more satellites, at least one fixed ground terminal such as a gateway system (GS) and several mobile access terminals (ATs). The access terminals typically communicate with the public switched telephone network (PSTN) or other mobile terminals via an air communication channel between the access terminals and the satellite, and between the satellite and the gateway system. The gateway system communicates with the public switched telephone network through land-based communication lines, such as fiberoptic or copper lines.

Unlike in the cellular environment, communications between the access terminal and the satellite, and between the satellite and the gateway system, are relatively unobstructed, (i.e. they are line-of-site) and therefore problems associated with multiple communications paths, e.g., multipath interference and delay spread are minimal or non-existent. In contrast to cellular communications environments, the primary source of signal distortion in the satellite context is noise, due to the very long path length between the access terminal and the satellite, and the satellite and the gateway system. The satellite channel often experiences fading, however this is most often slow fading relative to a data rate required for voice communication. In addition to amplitude variations, this slow fading also causes severe phase distortion on the received signal.

SUMMARY OF THE INVENTION

The present invention advantageously provides an approach to communications channel estimation, in a satellite communications system or other similar system, over a wide range of channel conditions, e.g., static to Rician with K=0 dB, with various Doppler rates. Advantageously, the present approach performs its channel estimation function with a substantially smaller processor demand than has been employed in prior art wireless approaches, such as communications approaches.

In one embodiment, the invention can be characterized as a method of channel estimation in a wireless communication system. The method has steps of receiving a data burst comprising a plurality of portions of known data, and remaining data that is unknown; comparing reference data to each of the plurality of portions of known data and determining error for each of the portions of known data; averaging the determined error for predetermined ones of the portions of known data; and estimating error for at least a portion of the remaining data as a function of the determined error having been averaged.

In a variation the receiving step involved receiving the data burst comprising at least four portions of known data.

In a further variation, the estimating error comprises estimating error for a portion of the remaining data between a first of the at least four portions, and a last of the at least four portion as a function of the determined error having been averaged.

In yet a further variation, the estimating error further comprises estimating error for a portion of the remaining data before the first of the at least four portions as a function of the determined error for the first of the at least four portions, and estimating error for a portion of the remaining data after the last of the at least four portions as a function of the determined error for the last of the four portions.

In an additional variation, the estimating error further comprises estimating error for a portion of the remaining data before the first of the at least four portions as a function of the estimated error between the first of the at least four portions and a second of the at least four portions, and estimating error for a portion of the remaining data after the last of the at least four portions as a function of the estimated error between the last of the four portions and a second-to-last of the four portions.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
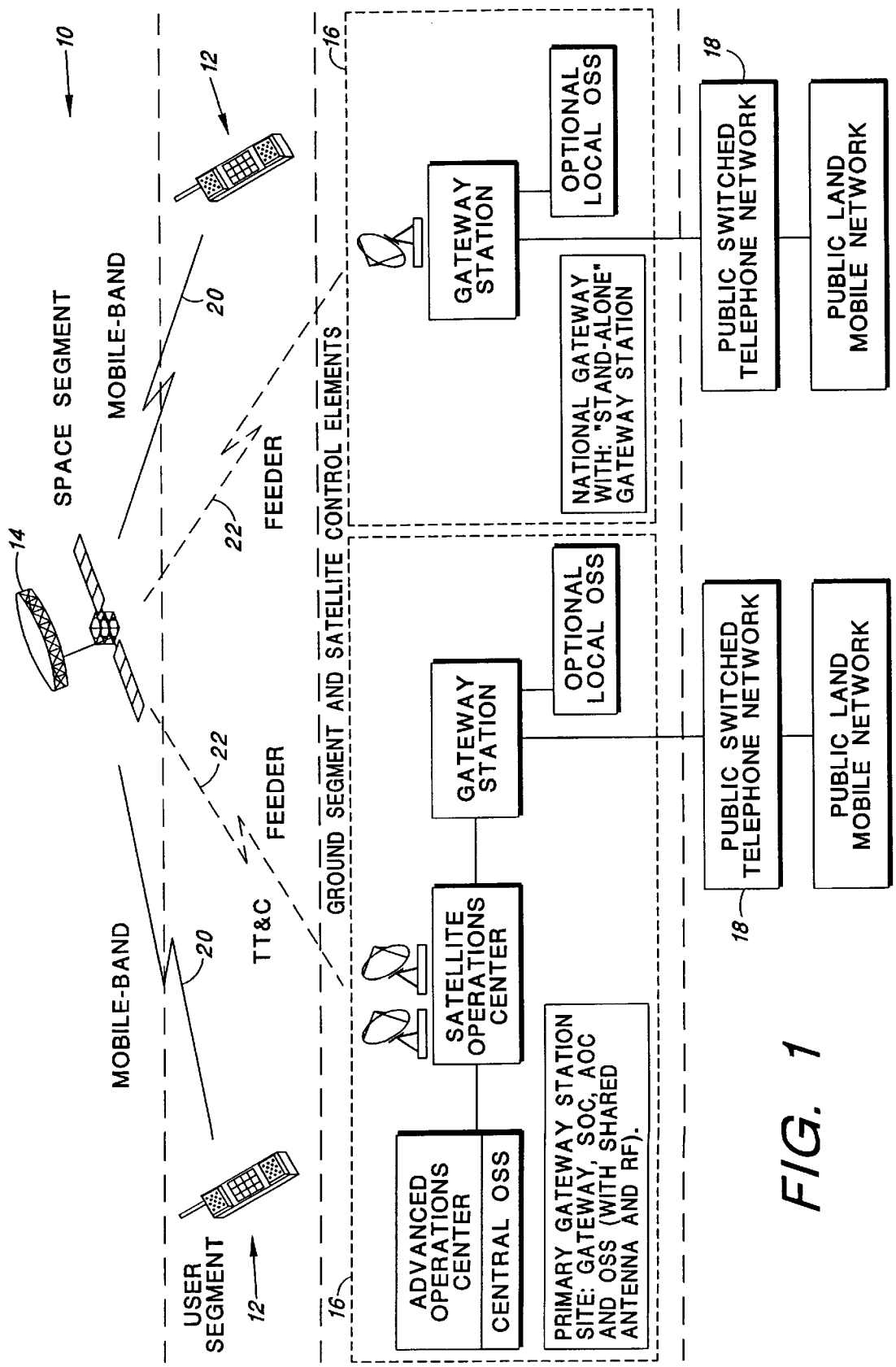
FIG. 1 is a schematic block diagram of a mobile satellite communication system in accordance with one embodiment of the present invention.

Referring first to FIG. 1, a preferred embodiment of a mobile satellite communication system 10 is illustrated,. The mobile satellite communication system 10 includes mobile access terminals 12 (ATs) and one or more medium earth orbit (MEO) satellites 14. One or more gateway systems 16 (GS) are also employed and are coupled to a public switched telephone network 18 (PSTN), which is part of a terrestrial land-line telephone system or network. The access terminal 12 is typically a hand-held telephone or vehicle-mounted telephone. The access terminal 12 communicates with the satellite 14 over an L-band frequency (or alternatively in S-band or other band applicable to mobile satellite communications) using a particular spot beam 20. Each spot beam 20 is associated with a predetermined geographic region as defined by the satellite 14. The gateway system 16 communicates with the satellite 14 over a Ku-band feederlink frequency. For example, the gateway system may be S-band, L-band, or any band applicable to mobile satellite communication.

The satellite 14 includes transponders for translating between L-band spot beam 20 signals (used by the access terminals 12) and Ku-band 22 signals (used by the gateway system 16). The gateway system 16 interfaces with a terrestrial telephone carrier, such as the public switched telephone network 18, and may also interface with a conventional cellular network. Accordingly, users may place telephone calls using the access terminal 12 to either land line or cellular telephone users. As illustrated in FIG. 1, a plurality of gateway systems 16 may be employed, each providing similar functions and being employed to access, for example, respective public switched telephone networks 18.

Subscribers to the mobile communications system 10 have unique telephone numbers allowing them to receive telephone calls when they are registered to receive pages. Registration is automatic when the access terminal 12 is turned on, such that a registration procedure locates the access terminal 12 within a particular spot beam coverage area after the access terminal 12 is turned on. In addition to originating calls, the access terminals 12 can receive calls from any terrestrial facility when the call is connected through the gateway system 16, which determines the location of the access terminal 12 and sends a paging message to the access terminal 12 to announce the incoming call.

Communication channels carried via the satellite 14 provide space segment resources used for control functions. i.e., one or more channels in each L-band spot beam 20 are control channels, e.g., the gateway 16 may place a forward control signal in each L-band spot beam 20 to allow synchronization of the access terminals 12 and to carry network control information from the gateway 16 to the access terminals 12. The control channels allow the access terminals 12 to acquire a satellite carrier and identify the L-band spot beam 20 and gateway station 16 that originates the forward control signal. The gateway 16 uses the control channel to page access terminals 12 using unique addresses and to announce mobile terminated calls. Each L-band spot beam 20 preferably contains a return direction signaling channel that access terminals 12 use to initiate and register calls with the gateway 16. During a call, in-band low data rate control channels are preferably available between the access terminals 12 and the gateway 16 for call supervision, power control, and to initiate call termination. For example, during burst communication between the access terminal 12 and the satellite 14, a threshold signal may be established relative to the strength of the transmitted burst for setting a power control bit based on a comparison of received signal strength with threshold values.

The system 10 contains considerable operational flexibility both from the standpoint of network features and mobile terminal capabilities. The gateway system 16 is a conventional gateway as understood in the art, which includes a mobile switching center (MSC), base station controllers (BSCs), base transceiver stations (BTS), and radio frequency units. As is understood by those skilled in the art, the mobile switching center allows communications with the public switched telephone network 18 or other mobile switching centers. The mobile switching center is connected preferably with an A-interface such as a standard E1 or E3 line with the base station controller. The base station controller is then connected through a communications channel such as a T1 line to one or more base transceiver stations which may communicate via radio frequency (RF) communications to he access terminal 12.

Telephone communications may be originated with the access terminal 12 by transmitting initialization data to the satellite 14 over a control channel which then communicates down to the gateway 16. The control channel is transmitted over a time slot within a frequency assigned to the spot beam 20 having a coverage area surrounding the access terminal 12. At the gateway 16, the call is transmitted via a radio frequency channel to the base transceiver station assigned to the spot beam 20 servicing the access terminal 12. From the base transceiver station the call is routed to the base station controller and then to the mobile switching center, from which the call is routed to either the public switched telephone network or another mobile switching center. Thereafter, a communications channel is established through the entire gateway system 16 and a subscriber using the access terminal 12 may communicate over the established communications channel.

Telephone communications may also originate from either the public switched telephone network by entering the gateway system 16 at the mobile switching center, which routes the communication to the base station controller system for paging the access terminal 12 via the appropriate base transceiver station. After the access terminal 12 responds to the page from the base transceiver station, a communications channel is then established.

The mobile satellite communications system provides duplex voice communications to a large number of access terminals 12 through medium earth orbit (MEO) communications satellites, such as the medium earth orbit satellite 14 of FIG. 1. The access terminals 12 will operate in the S-band and communicate using a low-rate encoded voice transmission and time division multiple access (TDMA), at a 36 kbps rate. Mobile traffic through the satellite 14 is aggregated at a large gateway 16 such as the gateway system 16 (also referred to herein as a satellite access node), that interfaces with the satellite 14 at feeder-link frequencies in the C-band.

Unlike in conventional cellular telephone technologies, wherein multi-path interference becomes a significant problem, thus justifying the computing resources and the overhead necessary to implement maximum likelihood sequence estimating equalizers, and the like, multi-path interference is a rarity in the context of satellite communications, at least when the satellite 14 is overhead, i.e., directly in a line of sight of the access terminal 12. Thus, the resources necessary to implement an equalizer, in accordance with prior art cellular communications approaches, are not well spent in the context of a mobile satellite communications system. There are, however, path distortions due to non-dominant multipath fading (usually slow fading since Doppler rate is much lower than data rate), and noise that occur in the communications channel that must be accounted for at the access terminal.

Figure 2:
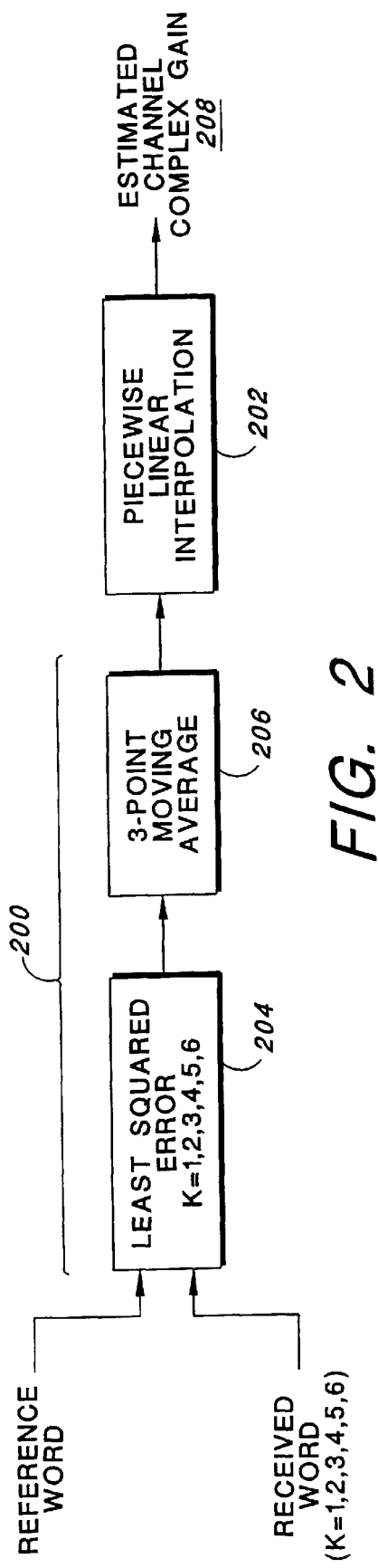
FIG. 2 is a block diagram showing steps traversed in generating a communications channel estimate in the embodiment of FIG. 1.

Referring to FIG. 2, a block diagram is shown of steps traversed by the mobile satellite communications system in generating a communication channel estimate.

Channel estimation is decomposed into two major steps. First, there is a direct estimation step 200 involving estimating channel complex gains at the six locations of the reference words within the burst. Second, there is an interpolation and extrapolation step 202 during which these six estimates are interpolated and extrapolated to other bit positions within the burst.

Figure 3:
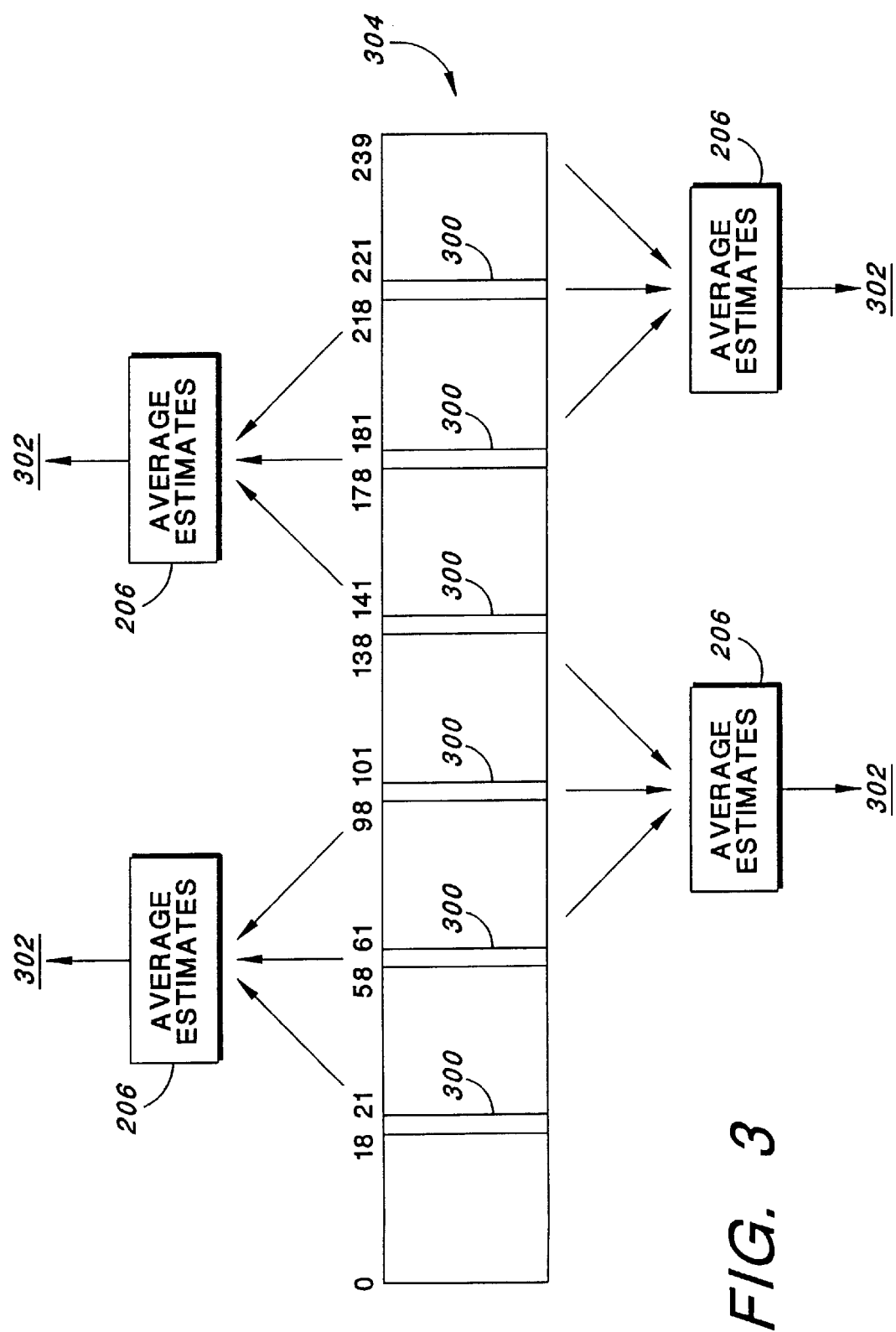
FIG. 3 is a schematic diagram showing a burst format for nominal penetration in the mobile satellite communications system of FIG. 1.

Referring next to FIG. 3, a schematic diagram is shown of a burst 304 for nominal penetration in the mobile satellite communications system. The burst 304 is shown with the location of six four-bit reference words 300. Starting bit numbers (bits are numbered from 0) for the six reference words are 18, 58, 98, 138, 178 and 218.

A least-square error criteria 204 (FIG. 2) is used to make estimates of the communications channel at the location of the reference words 300 (FIG. 3). The squared error, $e^2$, at each reference word 300 (FIG. 3) location is defined as the expected squared error between the received prediction filtered noisy signal and the filtered transmitted signal as scaled by the unknown complex channel gain $$e_k^2 = \sum_{i=0}^{3} |y_k(i) - x_k u_k(i)|^2$$

wherein k=1, 2, 3, 4, 5, 6 identify the six unique reference words in their time order, and $u_k(i)$ is the complex component of the transmitter waveform filtered by the receiver predetection filter corresponding to the ith bit of the kth unique word (i.e., the matching waveform samples). (Due to the innersymbol interference of GMSK modulation, $(u_k(i))$ is not strictly unique from burst to burst, i.e., it slightly changes with the random data surrounding the unique word.

In practice, the $u_k(i)$ is obtained by averaging the given unique word over a large number of bursts). $x_k$ is the channel complex gain at the kth unique word location. (It is assumed that the channel does not vary over a period of four bits or over the unique word because it is assumed that the path distortion is primarily due to slow fading.) $y_k(i)$ is the complex component of the received noisy prediction filtered GMSK signal sampled at the maximum eye opening instant of the ith bit of the kth unique word. It is assumed that $Y_k(i)$ is equal to $x_k^* u_k(i) + n_k(i)$ where $n_k(i)$ is the noisy sample at the corresponding sampling instant.

The $u_k(i)$ of parameters denote the filtered complex components of the transmitter GMSK signal (with no channel or noise effects) sampled at the maximum eye opening instant for the first, second, third and the fourth bits of the kth unique word. $u_k(i)$ turns out to be the same for all the reference words due to their positioning in the burst, which starts on an even bit number as shown in FIG. 3. As mentioned above, this parameter incorporates generally in the inter-symbol interference effects of adjacent data bits, but the average value, which is what will be needed for the above equation, is predetermined (off-line computed) for a given TX/RX pair. Therefore, $u_1(i)=u_2(i)=u_3(i)=u_4(i)=u_5(i)=u_6(i)=u(i)$.

By differentiating the squared error expression $e_k^2$ in the above equation, with respect to the unknown channel parameter $x_k$, and setting the resulting equation to zero, the channel estimate $\hat{x}_k$ is $$\hat{x}_k = \frac{\sum_{i=0}^{3} y_k(i) u(i)^*}{\sum_{i=0}^{3} |u(i)|^2}$$

This equation represents a normalized complex cross-correlation between the sample of the received filtered reference waveform and the conjugate of the average reference waveform (at the symbol rate).

The six sample estimates provided according the above-method are filtered through a three point moving average linear phase filter 206 (FIG. 2), providing four filtered samples 302 (FIG. 3) of the channel complex gain. (This is shown schematically in FIG. 3.) With this filtering, four smoothed samples 302 are obtained.

The four smoothed samples 302 obtained in this manner are interpolated 202 and extrapolated through piecewise linear interpolation to provide estimates of channel complex gain 208 at other bit locations within the burst.

In the piecewise linear interpolation 202, the channel estimates for the bits between any two consecutive smoothed samples 302 are obtained by simply reading them off the straight line connecting the two smoothed samples 302. For the first 58 bit locations, and the last 62 bit locations in the burst, the channel estimates are extrapolated from the adjacent line segments (the lines connecting the first two smoothed samples 302, and the last two smoothed samples 302, of the four, where direct channel estimates were made after the three point moving averaging 206). Alternatively, these first and last locations are set simply equal to the values of the first and fourth smoothed samples 302 at their edges. (The latter scheme is believed to work slightly better when the phase shift accumulated over the segments to be extrapolated due to residue frequency offset can be tolerated without degrading the performance of the demodulator).

Figure 4:
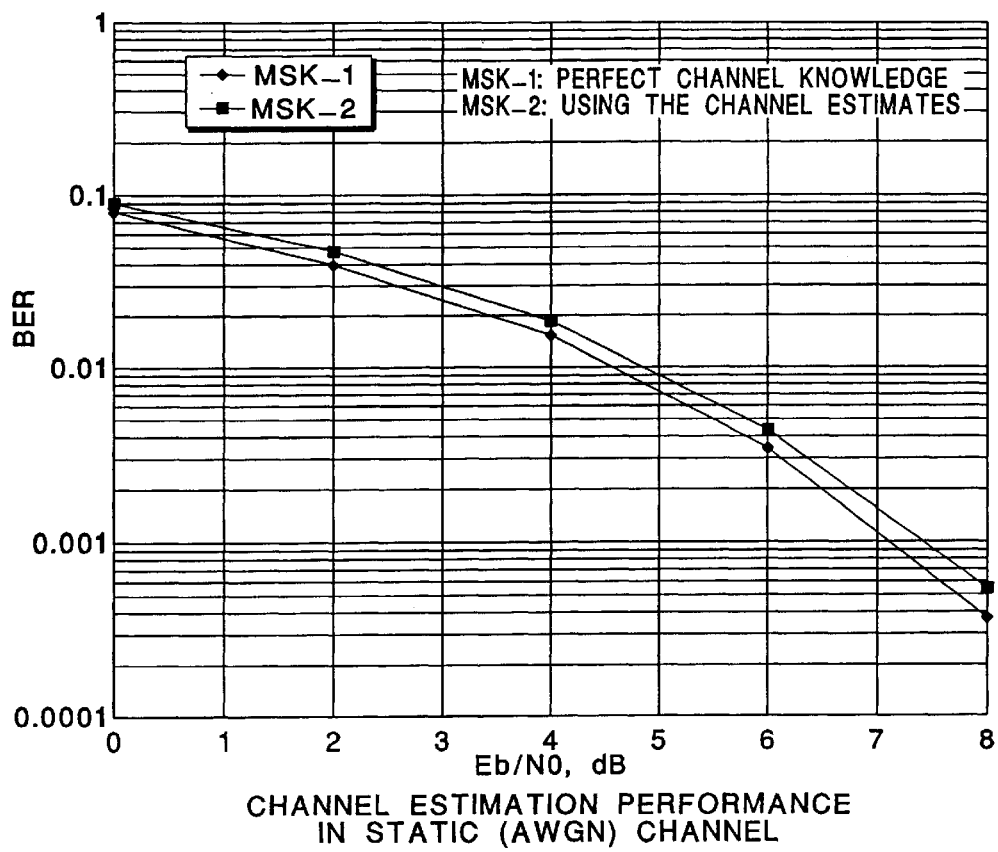
FIG. 4 is a graph of bit error rate (on a vertical axis) versus channel noise (on a horizontal axis) for Gaussian noise.
Figure 5:
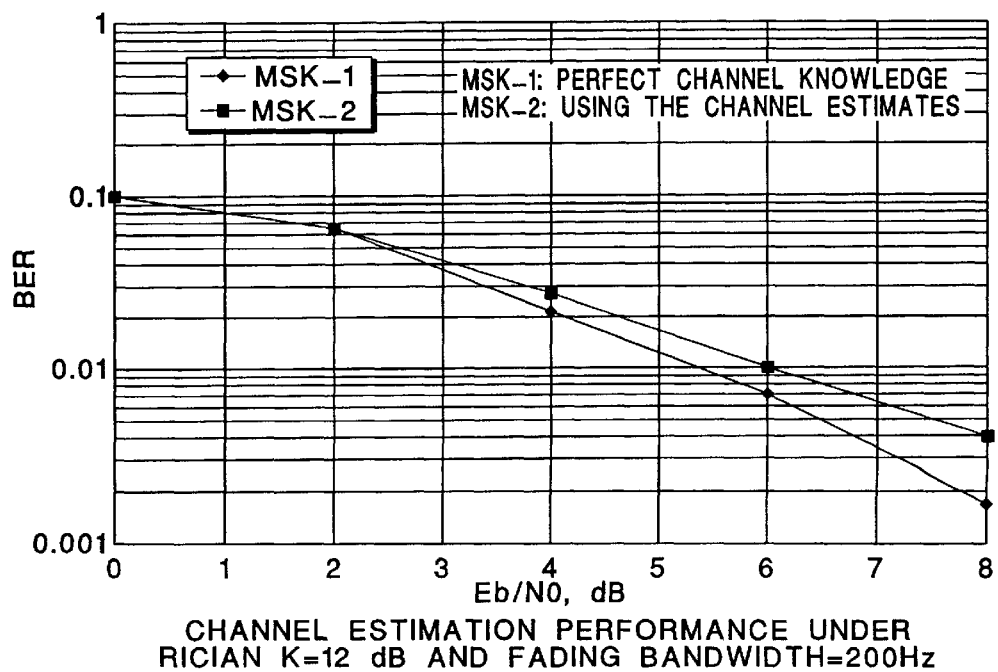
FIG. 5 is a graph of bit error rate (on a vertical axis) versus channel noise (on a horizontal axis) for a Rician channel condition with K=12 dB.
Figure 6:
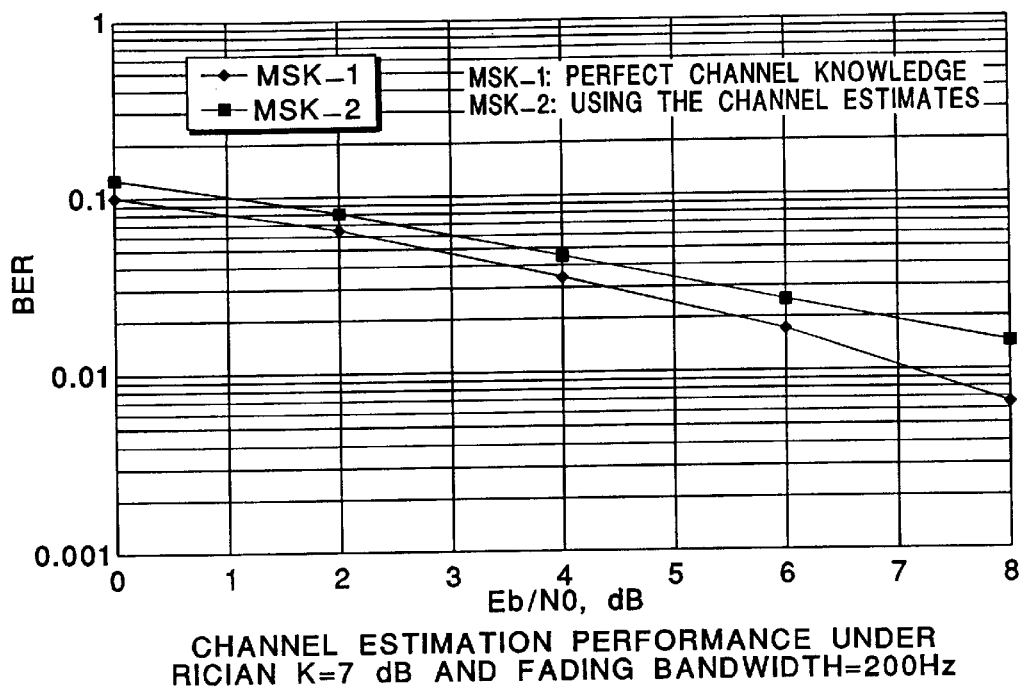
FIG. 6 is a graph of bit error rate (on a vertical axis) versus channel noise (on a horizontal axis) for a Rician channel condition with K=7 dB.

Referring next to FIGS. 4, 5, and 6, graphs are shown of bit error rate versus channel noise and static and changing channels.

Bit error rate results are obtained with the above channel estimation scheme for Gaussian (FIG. 4), Rician with K=12 dB (FIG. 5) and Rician with K=7 dB (FIG. 6). The bit error rate results obtained with perfect knowledge are also shown for evaluating performance of the channel estimation scheme of the present embodiment. In these simulations, the values for the transmitted signal I and Q components for each of the four bits in the reference word, i.e., as filtered by the receiver predetection filter (u(i) parameters in the above equations), are precomputed through simulation for a Gaussian predetection filter with a normalized bandwidth (i.e., BT product of 0.3), and a reference word of 0011. Three hundred bursts of random bits are used in the calculation of averaged values for u(i) parameters used in the numerator of the above channel estimate, $\hat{x}_k$, equation.

The basic least square (LS) criteria used to estimate the channel at a reference word location includes phase contributions due to any frequency offset. However, when filtering (smoothing) and interpolation are used subsequently to obtain noise reduced channel estimates at the other locations in the burst, the frequency offset phase effects may not be properly maintained. Therefore, it is necessary to estimate the frequency offsets and correct for them before the channel estimation process.

Figure 7:
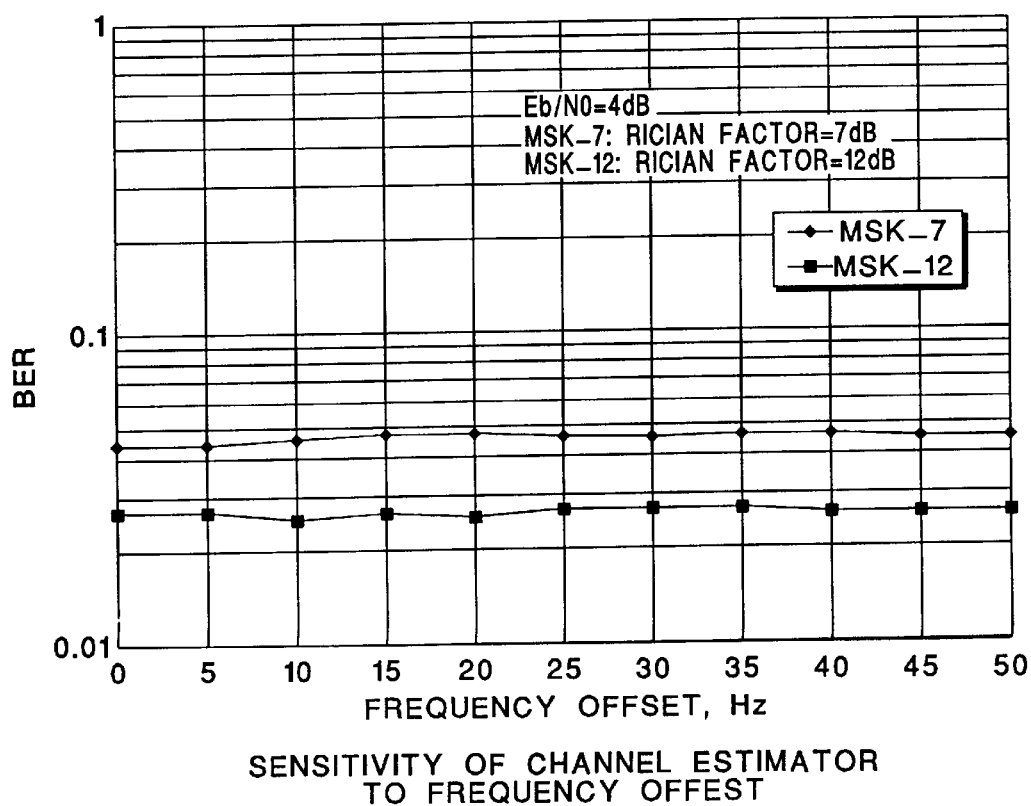
FIG. 7 is a graph illustrating sensitivity of the approach of FIG. 2 to frequency offset, wherein a bit error rate (on a vertical axis) versus frequency offset (on a horizontal axis) is shown.

Since there are inaccuracies associated with any frequency estimation algorithm, the sensitivity of the channel estimation algorithm of the present embodiment is evaluated for any residue frequency offsets left in the burst after the frequency estimation and correction process. In order to study the performance of the sensitivity of the channel estimation approach described herein to frequency offset, bit error rate results are obtained for a Rician channel at K=7 dB, and for a Rician channel at K=12 dB, for a signal-to-noise ratio of 4 dB (which is considered a typical operating condition for the mobile satellite communications system) and varying amounts of frequency offset. The results are illustrated in FIG. 7, where it is noted that performance of the approach of the present embodiment remains flat for a range of 0 to 50 Hz simulated frequency offset residue, which is adequate for the mobile satellite communications system described herein.

While the invention herein disclosed has been described by means of specific embodiments and applications thereof, numerous modifications and variations could be made thereto by those skilled in the art without departing from the scope of the invention set forth in the claims.

What is claimed is:

1. A method of channel estimation in a wireless communication system comprising:
   receiving a data burst comprising a plurality of portions of known data, and remaining data that is unknown;
   comparing reference data to each of the plurality of portions of known data and determining error for each of the portions of known data;
   averaging the determined error for predetermined ones of the portions of known data; and
   estimating error for at least a portion of the remaining data as a function of the determined error having been averaged.

2. The method of claim 1 wherein said receiving comprises receiving the data burst comprising at least four portions of known data.

3. The method of claim 2 wherein said estimating error comprises estimating error for a portion of the remaining data between a first of the at least four portions, and a last of the at least four portion as a function of the determined error having been averaged.

4. The method of claim 3 wherein said estimating error further comprises estimating error for a portion of the remaining data before the first of the at least four portions as a function of the determined error for the first of the at least four portions, and estimating error for a portion of the remaining data after the last of the at least four portions as a function of the determined error for the last of the four portions.

5. The method of claim 3 wherein said estimating error further comprises estimating error for a portion of the remaining data before the first of the at least four portions as a function of the estimated error between the first of the at least four portions and a second of the at least four portions, and estimating error for a portion of the remaining data after the last of the at least four portions as a function of the estimated error between the last of the four portions and a second-to-last of the four portions.

6. The method of claim 2 wherein said estimating error comprises interpolating linearly estimated error between a second determined one of the at least four portions and a third determined one of the at least four portions, as a function of the determined error having been averaged for a first determined one of the at least four portions, the second determined one of the at least four portions, and the third determined one of the at least four portions, and the determined error having been averaged for the second determined one of the at least four portions, the third determined one of the at least four portions, and a fourth determined one of the at least four portions.

7. The method of claim 1 wherein said comparing reference data and determining error for each of the portions of known data comprises determining a least squared error determination.

8. The method of claim 1 wherein said averaging the determined error for predetermined ones of the portions of known data comprises performing a three point moving average.

9. The method of claim 1 wherein said estimating error for at least a portion of the remaining data as a function of the determined error having been averaged comprises performing a piecewise linear interpolation.

10. The method of claim 1 wherein said comparing reference data and determining error for each of the portions of known data comprises determining a squared error $$e_k^2 = \sum_{i=0}^{3} |y_k(i) - x_k u_k(i)|^2$$

wherein k an integer index identifying the each of the portions of known data, order $u_k(i)$ is a complex component of the transmitter waveform filtered by the receiver prediction filter corresponding to an ith bit of a kth portion of known data, $x_k$ is a channel complex gain at the kth portion of known data, $y_k(i)$ is complex components of the burst sampled at ith bit of the kth portion of known data.

11. The method of claim 10 wherein said comparing reference data and determining error for each of the portions of known data further comprises determining a channel estimate $$x_k = \frac{\sum_{i=0}^{3} y_k(i)u(i)^*}{\sum_{i=0}^{3} |u(i)|^2}$$

wherein u(i) is equal to $u_k(i)$.

* * * * *